United States Patent Office 3,523,134
Patented Aug. 4, 1970

1

3,523,134
PHENYLINDANE MONOCARBOXYLIC ACIDS
James O. Knobloch, Hobart, Ind., assignor to Standard
Oil Company, Chicago, Ill., a corporation of Indiana
No Drawing. Filed Aug. 25, 1967, Ser. No. 663,243
Int. Cl. C07c 63/44
U.S. Cl. 260—515                    3 Claims

ABSTRACT OF THE DISCLOSURE

New compositions of matter are 1,1,3-trimethyl-3 (p-carboxyphenyl) indan; 1,1,3 - trimethyl-3-phenyl-5-carboxy indan, and mixtures thereof.

My invention relates to new compositions of matter which are monocarboxylic aromatic acids and mixtures of these acids. More specifically, my invention relates to 1,1,3-trimethyl-3 (p-carboxyphenyl) indan, which can be represented by the structural formula

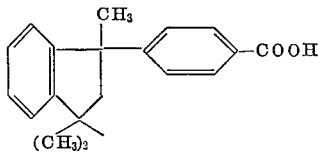

1,1,3-trimethyl-3-phenyl-5-carboxy indan, which can be represented by the structural formula

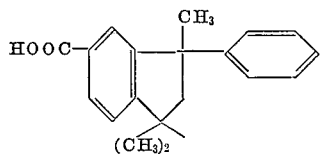

and mixture thereof. A mixture of these novel monocarboxylic acids has been found effective in control of late blight of tomatoes. These compositions also possess utility as useful intermediates for the preparation of derivative chemical compositions.

My novel compositions are conveniently made by the oxidation of a mixed dimer feedstock prepared from the dimerization of equal amounts of para-methyl-alpha-methylstyrene and alpha-methylstyrene. The preparation of the mixture of novel acids and the individual acids is described more fully in the procedure set forth hereinbelow, which includes preparation of the dimer feedstock, its oxidation, and the recovery of the individual acids.

A solution was made by mixing 2.28 mols of para-methyl-alpha-methylstyrene with 2.28 mols of alpha-methylstyrene. Half of the total solution was charged to a 2-liter, creased, three-neck flask equipped with a stirrer, reflux condenser, addition funnel and thermometer. The solution was heated to 146° C. and there was added 4.5 g. of powdered phosphoric acid on kieselguhr. The temperature of the solution began to rise and in three minutes reached 168° C. The remaining half of the mixed monomer solution was then added dropwise to the flask over 67 minutes, during which the refluxing solution temperature gradually rose to 205° C. The solution was then refluxed for an additional three hours, at the end of which the temperature had reached 267° C. The solution was then allowed to cool and was filtered to remove suspended catalyst. Analyses of the filtrate by gas chromatographic technique showed that each of the four possible dimers was present in about 22% yield and there was about 13% of unreacted monomers was byproducts.

The filtrate obtained as described hereinabove was added to 1.0 of phosphoric acid on kieselguhr in a round-bottom flask and vacuum distilled through a 40-tray Oldershaw column at about 200 mm. Hg absolute pressure. In addition to the dimer of alpha-methylstyrene and the dimer of para-methyl-alpha-methylstyrene, there was obtained 1,1,3-trimethyl-3-(para-tolyl) indan and 1,1,3,5-tetramethyl-3-phenyl indan. These last two dimers are most conveniently obtained as a mixture boling over the range of about 256° C. to about 262° C. They can, however, be separated by addition distillation to yield 1,3,3-trimethyl-1-(p-tolyl) indan having a boiling point of 258° C. at 200 mm. Hg and 1,3,3,5-tetramethyl-1-phenyl indan having a boiling point of 263–263° C. at 200 mm. Hg. The structure of these compositions as mixed dimers was established by nuclear magnetic resonance examination.

A mixed dimer heart cut obtained from a product distillation as described hereinabove was oxidized to form a mixture of 1,3,3-trimethyl-1-(p-carboxyphenyl)-indan and 1,1,3 - trimethyl - 3-phenyl-5-carboxy-indan. Oxidation was effected by batch reaction in a one-inch titanium reactor in six separate runs with a catalyst comprising cobalt acetate tetrahydrate, manganese acetate tetrahydrate and hydrobromic acid in accordance with techniques known to this art. There was employed an acetic acid solvent in a ratio of 5.7 parts acid to 1 part hydrocarbon feed and the weight percent of necessary catalyst elements, based upon the acetic acid used, was 0.087 cobalt, 0.044 manganese and 0.082 bromine. Air was passed through to supply oxygen for the oxidation at a rate of 131 standard cubic feet/hr./lb. of oxidizable hydrocarbon. The temperature during the reaction was in the range 359 to 373° F. and the total reaction time was about 13 minutes. There was obtained from the oxidation 190.0 g. of crude organic acids which was purified by crystallization from methanol after treatment with decolorizing carbon (Norite A). The recovered, purified acid product contained about 36.4 percent 1,1,3-trimethyl-3-(p-carboxyphenyl) indan and 61 percent of 1,1,3-trimethyl-3-phenyl-5-carboxy indan, the mixture having an acid number of 201.3.

Similar oxidation reactions carried out on purified dimers will provide pure samples of the individual acids. Alternatively, a sample of the mixed acids can be selectively recrystallized with a suitable solvent, such as methanol, to yield the individual acids. The melting point of 1,1,3-trimethyl-3-(p-carboxyphenyl) indan is 146–148° C. and of the 1,1,3-trimethyl-3-phenyl-5-carboxy indan is 175–177° C. Both acids have molecular weights of about 280 and acid numbers of about 200.

The utility of the above acids as intermediates for the preparation of a wide variety of organic compounds will be obvious to workers skilled in this art. The specific utility of a mixture of the acids prepared as described hereinabove by oxidation of a mixed dimer has been determined. The sample was submitted to the Crop Protection Institute of Durham, N.H. for screening as a biocide and was found to be effective to the extent of 94 percent control in the prevention of late blight of tomatoes, when applied in a concentration of 1000 p.p.m. by solution weight, just to the point of run-off of spray from the tomato plant leaves.

Having thus described my invention, what I claim is:
1. A composition which is a mixture of 1,1,3-trimethyl-3-(p-carboxyphenyl) indan and 1,1,3-trimethyl-3-phenyl-5-carboxy indan.
2. 1,1,3-trimethyl-3-(p-carboxyphenyl)-indan.
3. 1,1,3-trimethyl-3-phenyl-5-carboxy indan.

References Cited

UNITED STATES PATENTS

| 3,102,135 | 8/1963 | Petropoulos et al. | 260—515 |
| 3,385,905 | 5/1968 | Smith et al. | 260—668 |

JAMES A. PATTEN, Primary Examiner

U.S. Cl. X.R.

260—670; 424—317